(12) United States Patent
Griard

(10) Patent No.: US 7,823,377 B2
(45) Date of Patent: Nov. 2, 2010

(54) SYSTEM FOR CONTROLLING THE FUNCTION OF A DIESEL ENGINE IN A MOTOR VEHICLE CONNECTED TO AN OXIDATION CATALYST

(75) Inventor: Christophe Griard, Ivry la Bataille (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 940 days.

(21) Appl. No.: 11/572,029

(22) PCT Filed: Jun. 29, 2005

(86) PCT No.: PCT/FR2005/050519

§ 371 (c)(1), (2), (4) Date: Jan. 12, 2007

(87) PCT Pub. No.: WO2006/016080

PCT Pub. Date: Feb. 16, 2006

(65) Prior Publication Data

US 2008/0000220 A1    Jan. 3, 2008

(30) Foreign Application Priority Data

Jul. 15, 2004    (FR)    ................................... 04 07885

(51) Int. Cl.
*F01N 3/00*    (2006.01)
(52) U.S. Cl. ............................. 60/286; 60/300; 60/273; 60/285
(58) Field of Classification Search .................. 60/273, 60/274, 277, 282, 285–287, 289–290, 299–301
See application file for complete search history.

(56) References Cited

U.S. PATENT DOCUMENTS 5,842,341 A * 12/1998 Kibe ........................... 60/274

(Continued)

FOREIGN PATENT DOCUMENTS

DE    10253979 A1    6/2004

(Continued)

OTHER PUBLICATIONS

International Search Report mailed Nov. 11, 2005 in PCT/FR2005/050519.

*Primary Examiner*—Thomas E Denion
*Assistant Examiner*—Jesse Bogue
(74) *Attorney, Agent, or Firm*—Nicolas E. Seckel

(57) ABSTRACT

A system for controlling the function of a diesel engine (1) in a motor vehicle having anti-pollution means (6, 7) includes an oxidation catalyst (6) and arranged in the exhaust system (3) of said engine (1). The catalyst (6) has at least one non-initialized state and one initialized state and the engine (1) has means (8) for supplying the engine cylinders with fuel with at least one injection during the recovery phase thereof. The system includes a single temperature sensor (18) downstream of the catalyst (6) and means (19) for controlling the supply means (8) by switching of the phase control and/or the quantity of fuel injected during the recovery phase between a first value for the initialization of the catalyst and a second value for maintaining the initialized state of the catalyst as a function of the measured temperature downstream of the catalyst.

21 Claims, 7 Drawing Sheets

U.S. PATENT DOCUMENTS

| | | |
|---|---|---|
| 6,598,387 B2 * | 7/2003 | Carberry et al. ............... 60/297 |
| 6,640,540 B2 * | 11/2003 | Sato et al. .................... 60/297 |
| 6,708,487 B2 * | 3/2004 | Morimoto et al. ............. 60/311 |
| 2001/0027643 A1 | 10/2001 | Tokuyasu et al. |
| 2002/0078681 A1 | 6/2002 | Carberry et al. |
| 2002/0157386 A1 | 10/2002 | Hiranuma et al. |
| 2004/0028587 A1 * | 2/2004 | Twigg .................... 423/213.2 |
| 2004/0035101 A1 | 2/2004 | Imai et al. |
| 2004/0065077 A1 * | 4/2004 | Ueno et al. .................. 60/288 |
| 2004/0123586 A1 * | 7/2004 | Kuboshima et al. ........... 60/277 |
| 2004/0129065 A1 * | 7/2004 | Plote et al. ................. 73/117.3 |

FOREIGN PATENT DOCUMENTS

| | | |
|---|---|---|
| EP | 1138900 A | 10/2001 |
| EP | 1245814 A | 10/2002 |
| EP | 1384879 A | 1/2004 |
| EP | 1400663 A | 3/2004 |

\* cited by examiner

SYSTEM FOR CONTROLLING THE FUNCTION OF A DIESEL ENGINE IN A MOTOR VEHICLE CONNECTED TO AN OXIDATION CATALYST

BACKGROUND ART

The present invention concerns a system for controlling the operation of a motor vehicle diesel engine associated with depollution means comprising an oxidation catalyst and arranged in an exhaust line of this engine, this catalyst having at least one non-initialized operating state and one initialized operating state, and this engine being also associated with means for supplying fuel to the cylinders thereof according to least one injection during their expansion phase.

It is constant that the combustion of fuel in a Diesel engine causes an emission of pollutants, such as, for example, nitrogen oxide (NOx) and sulfur (Sox) particles. In order to reduce these emissions, in a standard manner, the engine is associated with an exhaust line equipped with depollution means comprising a particle filter (PF) or a NOx trap, for example, intended to store such particles.

Since the depollution means do not have an unlimited storage capacity, it is necessary to regenerate them periodically and/or regularly. To this effect, the exhaust line comprises, upstream of the depollution means, an oxidation catalyst adapted to generate an exotherm upstream of these depollution means, which increases their internal temperature and thus assists their regeneration.

In a standard manner, a diesel engine is associated with means for supplying fuel to its cylinders, adapted to supply the cylinders according to multiple fuel injections during their expansion phase, or "post-injections," or else to shift the main injection toward the expansion phase. The fuel thus injected during the expansion phase of the cylinders is unburned and is delivered to the catalyst for its oxidation and for the production of the exotherm.

In order for the fuel supplied to the catalyst to be oxidized in a satisfactory manner, the catalyst must have a sufficient internal temperature, i.e., an "initialized" operating state. To bring it into such a state, the means for supplying fuel to the cylinders are adapted to supply the cylinders according to a predetermined catalyst initialization value.

In its initialized state, the catalyst then generates an exotherm in an efficient manner by oxidizing the fuel from the fuel injection supplied by the supply means adjusted to a predetermined initialized state-maintaining injection value.

Systems for controlling the operation of a diesel engine of the type mentioned above are known in the state of the art, which are adapted to assist the regeneration of the PF by evaluating the operating state of the catalyst and by controlling the commutation between post-injection values on the basis of this evaluation.

For example, the patent FR 2 804 176 describes such a control system which comprises first and second temperature sensors arranged in the exhaust line upstream and downstream of the catalyst, respectively. The measurements from these sensors are supplied to means for controlling the supply means adapted to estimate the state of the catalyst as a function, of both temperature measurements upstream and downstream of the catalyst and to control the commutations between post-injection values as a function of the estimated operating state of the catalyst.

SUMMARY OF THE INVENTION

A consequence of the use of two sensors is that the probability of a system failure, sensor malfunction, bad calibration thereof, or others, is multiplied, and that a high cost is incurred.

The objective of the present invention is to remedy the above-mentioned problems.

To this effect, an object of the present invention is a system for controlling the operation of a motor vehicle diesel engine associated with depollution means comprising an oxidation catalyst and arranged in an exhaust line of this engine, this catalyst having at least a non-initialized operating state and an initialized operating state, and this engine being also associated with means for supplying fuel to the cylinders thereof according to at least one injection during their expansion phase, characterized in that it comprises:

a single temperature sensor placed in the exhaust line of the engine downstream of the catalyst to measure the temperature downstream of the catalyst; and means for controlling the means for supplying fuel to the cylinders adapted to control the commutation of the phasing and/or of the amount of fuel injected during the expansion phase between a first initialization value of the catalyst and a second initialized operating state-maintaining value as a function of the measurement of the temperature downstream of the catalyst.

According to another characteristic, the system is characterized in that the control means comprise:

means for estimating the operating state of the catalyst as a function of the temperature downstream of the catalyst; and driving means adapted to drive the commutation between said first and second initialization and initialized state-maintaining values as a function of the operating state of the catalyst estimated according to a predetermined commutation law.

According to another characteristic, the system is characterized in that the means for estimating the operating state of the catalyst comprise:

means for forming the time derivative of the temperature measurement downstream of the catalyst; and means forming a derivative/temperature map adapted to estimate the operating state of the catalyst as a function of the localization of the temperature measurement downstream of the catalyst and of its derivative in a zone of a predetermined derivative/temperature map of at least a first operating zone, representative of the non-initialized operating state of the catalyst, and a second operating zone, representative of the initialized operating state of the catalyst.

According to another characteristics, the system is characterized in that it comprises additionally means for acquiring operating parameters of the engine and/or driving parameters of the vehicle, and in that the estimation means comprise means for correcting the predetermined derivative/temperature map as a function of the parameters acquired.

According to another characteristic, the system is characterized in that the means for acquiring operating parameters of the engine and/or driving parameters of the vehicle are adapted to measure the outside temperature of the vehicle, and in that the correction means are adapted to correct the derivative/temperature map as a function of the outside temperature measured.

According to another characteristic, the system is characterized in that the means for acquiring operating parameters of the engine and/or driving parameters of the vehicle are adapted to measure the speed of the vehicle, and in that the means for correcting the derivative/temperature map are adapted to correct the predetermined derivative/temperature map as a function of the speed of the vehicle measured.

According to another characteristic, the system is characterized in that it comprises additionally means for measuring the air flow rate at the inlet of the engine, and in that the means for estimating the operating state of the catalyst comprise means forming flow rate/temperature map adapted to estimate the operating state of the catalyst as a function of the localization of the air flow rate measurements and temperature measurements downstream of the catalyst in a zone of a predetermined flow rate/temperature map of at least a first operating zone, representative of the non-initialized operating state of the catalyst, and a second operating zone, representative of the initialized operating state of the catalyst.

According to another characteristic, the system is characterized in that it comprises additionally means for acquiring operating parameters of the engine and/or driving parameters of the vehicle, and in that the estimation means comprise means for correcting the predetermined flow rate/temperature map as a function of the parameters acquired.

According to another characteristic, the system is characterized in that the means for acquiring operating parameters of the engine and/or driving parameters of the vehicle are adapted to measure the outside temperature of the vehicle, and in that the means for correcting the flow rate/temperature map are adapted to correct the flow rate/temperature map as a function of the outside temperature measured.

According to another characteristic, the system is characterized in that the means for acquiring operating parameters of the engine and/or driving parameters of the vehicle are adapted to measure the speed of the vehicle, and in that the means for correcting the derivative/temperature map are adapted to correct the flow rate/temperature map as a function of the speed of the vehicle measured.

According to another characteristic, the system is characterized in that the depollution means comprise, downstream of the catalyst and of the temperature sensor, a NOx trap that needs to be regularly and/or periodically regenerated, the catalyst being adapted, in its initialized operating state, to increase the temperature of the NOx trap to facilitate its regeneration by combustion of the particles trapped therein, and in that the driving means are adapted at least to optimize the regeneration of the NOx trap.

According to another characteristic, the system is characterized in that the depollution means comprise, downstream of the catalyst and of the temperature sensor, a particle filter that needs to be regularly and/or periodically regenerated, the catalyst being adapted, in its initialized state, to increase the temperature of the particle filter to facilitate its regeneration by combustion of the particles trapped therein, and in that the driving means are adapted at least to optimize the regeneration of the particle filter.

According to another characteristic, the system is characterized in that the driving means are adapted to drive the commutation between said first and second initialization and initialized state-maintaining values according to a predetermined transition law that maximizes a predetermined criteria of the type $Q_c/Q_p$, where $Q_c$ is the amount of heat released by the catalyst downstream thereof and $Q_p$ is the amount of pollutants emitted by the catalyst, in order to minimize the amount of pollutants emitted by the catalyst while maximizing the amount of heat released by this catalyst.

According to another characteristic, the system is characterized in that the control means comprise means for forcing the injection of fuel into the cylinders during their expansion phase at the first initialization value of the catalyst as soon as an idle of the engine has lasted at least a predetermined threshold idle duration, and this during a predetermined forcing duration after the instant of the end of such idle of the engine.

According to another characteristic, the system is characterized in that the forcing means comprise means for determining the threshold idle duration as a function of the measurement of the temperature downstream of the catalyst at the instant of the start of the idle.

According to another characteristic, the system is characterized in that the means for determining the threshold idle duration comprise:
  means for acquiring the instant of the start of the idle; and
  means forming map of threshold idle durations adapted, at the acquisition of the instant of the start of the idle, to determine the threshold idle duration by evaluating, for the measurement of the temperature downstream of the catalyst at the instant of the start of the idle, a predetermined map of idle duration values as a function of temperature values downstream of the catalyst.

According to another characteristic, the system is characterized in that the means for determining the threshold idle duration comprise additionally means for correcting the predetermined map of idle duration values as a function of predetermined operating parameters of the engine and/or driving parameters of the vehicle.

According to another characteristic, the system is characterized in that the means for correcting the predetermined map of idle duration values are adapted to acquire the outside temperature of the vehicle and/or the speed of the vehicle at the instant of the start of the idle and to correct the predetermined map of idle duration values as a function of this outside temperature acquired and/or of this speed measurement acquired.

According to another characteristic, the system is characterized in that the forcing means comprise means for determining the threshold forcing duration as a function of the measurement of the temperature downstream of the catalyst at the instant of the end of the idle.

According to another characteristic, the system is characterized in that the means for determining the threshold forcing duration comprise:
  means for acquiring the instant of the end of the idle; and
  means forming forcing duration map adapted, at the instant of the end of the idle, to determine the forcing duration by evaluating, for the measurement of the temperature downstream of the catalyst at the instant of the end of the idle, a predetermined map of forcing duration values as a function of temperature values downstream of the catalyst.

According to another characteristic, the system is characterized in that the means for determining the threshold forcing duration comprise additionally means for correcting the predetermined map of forcing duration values as a function of predetermined operation parameters of the engine and/or driving parameters of the vehicle.

According to another characteristic, the system is characterized in that the means for correcting the predetermined map of forcing duration values are adapted to acquire the outside temperature of the vehicle and/or the speed of the vehicle at the instant of the end of the idle and to correct, the predetermined map of forcing duration values as a function of this outside temperature of the vehicle acquired and/or of this measurement of the speed of the vehicle acquired.

According to another characteristic, the system is characterized in that it comprises additionally means for diagnosing the operating state of the temperature sensor downstream of the catalyst, and in that the driving means are adapted to implement a predetermined commutation strategy by default if the temperature sensor is diagnosed as failing.

BRIEF DESCRIPTION OF THE DRAWINGS

The present invention will be better understood by reading the following description, given by way of example only and made in reference to the annexed drawings in which.

DETAILED DESCRIPTION OF PARTICULAR EMBODIMENTS

Figure 1:
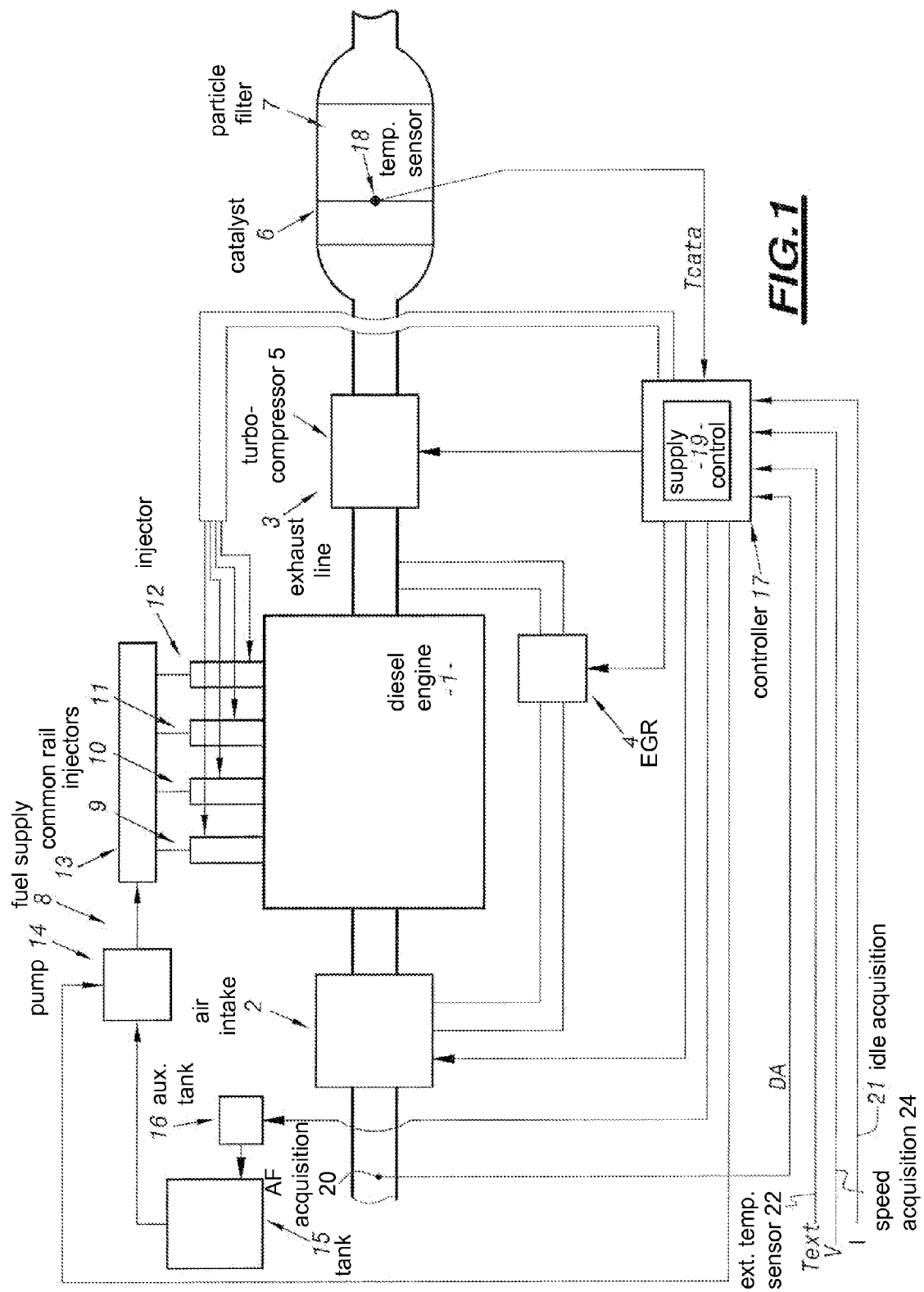
FIG. 1 is a schematic view of a control system according to the invention associated with a diesel engine.

On FIG. 1, a diesel engine 1 for a motor vehicle has been illustrated.

This engine is associated with air intake means 2 at the inlet thereof and to a burned gases exhaust line 3. Means 4 for recycling a portion of the exhaust gas (EGR) are also provided and arranged, for example, between the outlet of the engine and the air intake means 2.

In a standard manner, the exhaust line is also associated with a turbo-compressor 5, and more particularly the turbine portion thereof.

To limit the emission of pollutants, and in particular the emission of nitrogen oxide and/or sulfur particles, the exhaust line comprises additionally depollution means 6, 7 comprising an oxidation catalyst 6 and, for example, a particle filter 7 placed downstream of the catalyst.

Of course, the depollution means can comprise an oxidation catalyst associated with a NOx trap.

The catalyst 6 has, in a standard manner, at least two operating states, i.e., an initialized operating state in which its internal temperature is sufficiently high to burn hydrocarbons supplied by the engine, and a non-initialized operating state in which its temperature is too low to perform such an operation.

As is known in itself in the state of the art, the catalyst 6 is provided in the exhaust line to generate, at the inlet of the PF, an exotherm by oxidation of fuel. This exotherm makes it then possible to increase the internal temperature of the PF, thus facilitating its regeneration.

The engine 1 is also associated with means 8 for supplying fuel to the cylinders thereof, in this example, four cylinders, by means of injectors 9, 10, 11, 12, which are, for example, electrically controlled.

The supply means 8 can also comprise a supply common rail 13, connected to injectors 9, 10, 11, 12 and connected to a high pressure pump 14 for its fuel supply from a fuel tank 15.

The tank 15 can be associated with means for adding to the fuel an additive, stored in an auxiliary tank 16 and intended to be deposited on the PF to lower the combustion temperature of the particles trapped therein, and thus to assist its regeneration.

The engine and the various parts which have just been described are also associated with a system for controlling their operation. This system comprises in particular control means 17, comprising any appropriate computer, connected to a predetermined group of means for acquiring data relative to the operation of the engine, the associated parts, and/or driving conditions of the vehicle.

The control means 17 are adapted to supply a group of operation control signals, to the engine and to the associated parts, as a function of the acquired data, as this is known in itself in the state of the art.

For example, the system for controlling the operation of the engine is adapted to control the means 8 for supplying fuel to the cylinders to supply fuel thereto according to at least one main injection, and a pilot injection intended to minimize the combustion noise in the engine 1.

The system for controlling the operation of the engine is further adapted to drive the fuel supply means 8 so that they deliver at least one fuel injection into the cylinders during the expansion phase thereof, for example, multiple injections or "post-injections," in order to control the operating state of the catalyst 6 to optimize the emission of pollutants by the engine of the vehicle.

Of course, as a variant, the control system can be adapted to drive the supply means 8 so that they shift the main injection of fuel into the cylinders toward the expansion phase thereof, also in order to control the operating state of the catalyst 6 to optimize the emission of pollutants.

The control system is in particular adapted to control, in accordance with a predetermined commutation control strategy, the commutation of the phasing and/or of the amount of fuel injected during the expansion phase, in this example, during the post-injections, between an initialization value of the catalyst 6 and an initialized operating state-maintaining value of the catalyst 6, as will be explained in more details below.

The catalyst initialization value of the post-injections is intended in particular to raise the internal temperature of the catalyst to a predetermined temperature enabling this catalyst to oxidize larger amounts of fuel from the post-injections.

The catalyst initialized state-maintaining value of the post-injections is, for its part, intended to generate an exotherm to raise the temperature upstream of the PF by conversion of the fuel sent to the catalyst, the amount of fuel supplied by such post-injections being all the higher as an important exotherm upstream of the PF is desired.

For the commutation control, the control system comprises a single temperature sensor 18 placed in the exhaust line 3 downstream of the catalyst 6 to measure the temperature Tcata downstream of the catalyst and means 19 for controlling the supply means 8 which receive as an input the temperature measurement Tcata of the sensor 18 and adapted to control the commutation between the post-injection values as a function thereof.

The control means 19 are, for example, arranged in the control means 17 which have sufficient computing and memorizing capacities to implement the predetermined commutation control strategy. Of course, the control means 19 can also consist in means independent from the control means 17, such as, for example, a specific data processing unit.

The system according to the invention comprises additionally means 20 for acquiring the air flow rate AF at the inlet of the engine and means 21 for acquiring the idle I of the engine, for example, means for acquiring the acceleration request by the driver by means of an acceleration pedal. These acquisitions are supplied to the control means 19, which use them to implement some portions of the predetermined commutation control strategy, as will be explained more in details below.

Finally, in an advantageous manner, the above-mentioned control strategy is capable of being defined by parameters in real time to take into account the instantaneous characteristics of the operation of the engine and/or of the driving of the vehicle. The parameters of this strategy are determined by the control means 19 as a function of measurements of predetermined values such as the outside temperature Text and the speed V of the vehicle, for example, as will be explained also more in details below. To this effect, the control system according to the invention comprises additionally a sensor of the outside temperature Text of the vehicle, and means 24 for acquiring the speed V of the vehicle.

Figure 2:
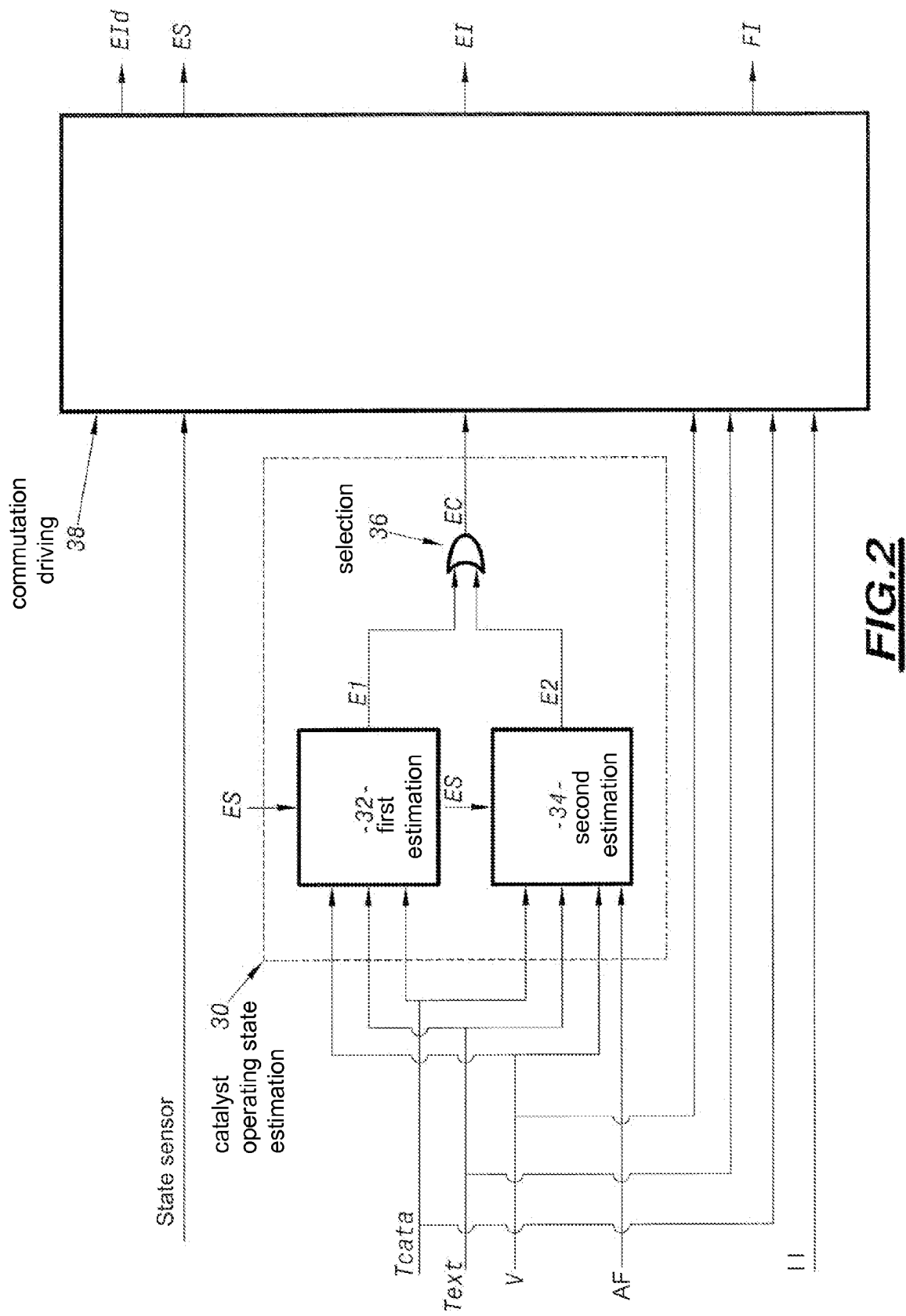
FIG. 2 is a schematic view of the means for controlling the supply means which are part of the system of FIG. 1.

FIG. 2 is a schematic view of the means 19 for controlling the supply means implementing the commutation strategy between the post-injection values.

The control means 19 comprise means 30 for estimating the operating state of the catalyst receiving as an input the measurement of the temperature Tcata downstream of the catalyst and adapted to estimate the state of the catalyst as a function thereof.

In an advantageous manner, the estimation means 30 comprise first and second estimation means 32, 34 implementing two distinct estimations of this state and supplying the estimated states E1 and E2, respectively. This makes it possible in particular to obtain a redundancy in the estimation of the state of the catalyst, and thus, an increased reliability thereof.

The estimated states of the catalyst E1, E2 are supplied to means 36 for selecting one of the estimated states E1, E2, for example, based on a preference criteria, a time criteria, or others.

In the following, the convention will be adopted according to which the value of the estimated operating state of the catalyst has the value 0 when the non-initialized operating state is concerned, and the value 1 when the initialized operating state is concerned.

A first embodiment of the selection means 36 consists in, for example, means performing the logical function "OR," so that the selection between the estimated states E1 and E2 is performed by preference toward the initialized operating state.

Another embodiment of the selection means 36 consists in, for example, means selecting the estimated state having the most recent variation of its value, so as to favor the estimation of the operation state of the catalyst that has the fastest dynamics in order to obtain a reactive commutation strategy between the post-injection values.

The selection means 36 supply the selected state, designated EC, to driving means 38. The driving means 38 are adapted to drive the commutation between the post-injection values as a function of the estimated state EC of the catalyst, as will be explained more in details below.

The structure and the operation of the first estimation means 32 will now be described in relation to FIGS. 3 and 4.

The estimation means 32 comprise means 40 for forming the time derivative dTcata/dt of the measurement of the temperature downstream of the catalyst received from the temperature sensor 18. For example, the temperature sensor 18 contains an analog/digital converter and the means 40 for forming the derivative implement a digital derivation filter of this digital measurement to obtain a digital time derivative.

The means 40 for forming the derivative can also comprise filtering and/or saturation means to obtain a derivative that is smoothed and/or comprised in a useful range of values.

The estimation means 32 comprise further means 42 forming derivative/temperature map receiving as an input the measurement of the temperature Tcata and its derivative dTcata/dt. These means 42 are adapted to estimate the operating state of the catalyst as a function of the localization of the measurement of the temperature Tcata downstream of the catalyst and of its derivative dTcata/dt in a zone of a predetermined derivative/temperature map of at least a first operating zone ZNI, representative of the non-initialized operating state of the catalyst, and a second operating zone ZI, representative of the initialized state of the catalyst.

Figure 4:
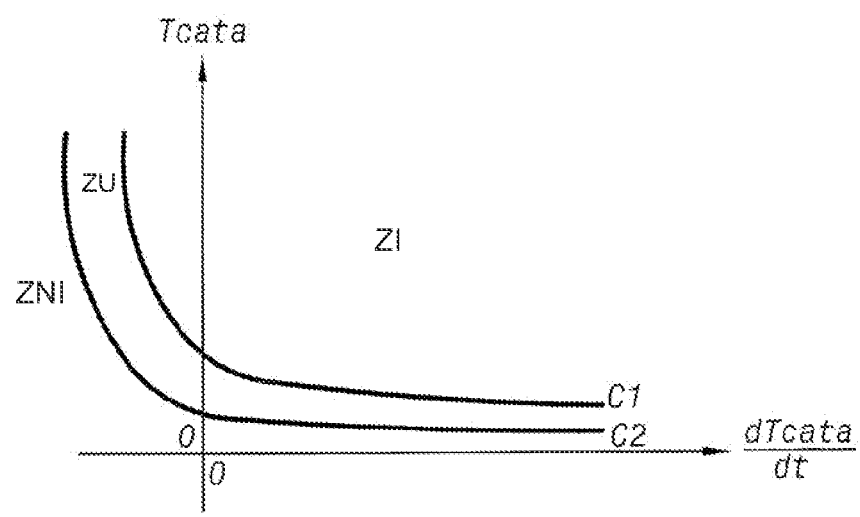
FIG. 4 is a graph of a derivative/temperature map implemented by the estimation means of FIG. 3.

An example of such a map is illustrated on FIG. 4.

FIG. 4 is a graph having, on the ordinate, the time derivative dTcata/dt of the temperature downstream of the catalyst, and on the abscissa, the temperature Tcata downstream of the catalyst. The map comprises two distinct curves C1 and C2, for example, determined during a previous study and memorized in the form of a correspondence table in the map-forming means 42.

These curves C1 and C2 define three zones, i.e., the zone ZNI representative of the non-initialized operating state of the catalyst, the zone ZI representative of the initialized operating state of the catalyst, and an undetermined zone ZU.

If the estimated operating state of the catalyst at the $k^{th}$ sampling instant is designated by $E1(k\Delta t)$, the values of the couple (dTcata/dt, Tcata) at the $k^{th}$ and $(k+1)^{th}$ sampling instants by $C(k\Delta t)$ and $C((k+1)\Delta t)$, respectively, then the estimated operating state $E1((k+1)\Delta t)$ of the catalyst at the $(k+1)^{th}$ sampling instant is determined by the map-forming means 42 according to the following table 1:

TABLE 1

| Localization of $C(k\Delta t)$ | Localization of $C((k+1)\Delta t)$ | Estimated value of $E1((k+1)\Delta t)$ |
| --- | --- | --- |
| ZNI | ZNI | 0 |
| ZNI | ZU | 0 |
| ZNI | ZI | 1 |
| ZU | ZNI | 0 |
| ZU | ZU | $E1(k\Delta t)$ |
| ZU | ZI | 1 |
| ZI | ZI | 1 |
| ZI | ZU | 1 |
| ZI | ZNI | 0 |

In another embodiment of the map-forming means 42, the derivative/temperature map comprises only one curve and thus, the undetermined zone ZU does not exist. The estimated operating state $E1((k+1)\Delta t)$ corresponds then to the zone in which the couple $C((k+1)\Delta t)$ is located. However, when the couple $C((k+1)\Delta t)$ is substantially close to the curve delimiting the zones ZNI and ZI, an oscillation of the estimation can be observed, because of the successive crossing of this limit by the couple (dTcata/dt, Tcata) triggered by the error on the temperature measurement, the digital precision of the control system, the formation of the derivative, or the oscillations in the operation of the engine, for example. Thus, the introduction of the undetermined zone ZU is particularly advantageous to minimize such oscillation.

Further, the map-forming means 42 can also comprise anti-rebound means consisting in validating the estimation if the estimated state is constant during a predetermined duration.

The estimation means 32 receive additionally as an input the operating parameters of the engine and/or driving parameters of the vehicle from the associated acquisition means, in particular the measurement of the outside temperature Text and of the speed V of the vehicle, in order to correct in real time the map of the means 42 in order to implement an adaptive estimation of the operating state of the catalyst.

More particularly, the measurement of the outside temperature Text of the vehicle is supplied to means 44 for correcting the derivative/temperature map. These correction means 44 are, for example, adapted to determined a corrective parameter, for example, by interrogation of a correspondence table memorized in the correction means 44, as a function of the measurement of the outside temperature Text for each value of the curves C1 and C2 memorized in the correspondence table of the mapping means 42 and to multiply each value of the curves C1 and C2 by the associated corrective parameter determined.

If the map-forming means 42 estimate the state of the catalyst by determining the position of the couple (dTcata/dt, Tcata) with respect to each of the curves C1 and C2 by evaluating the value of this curve for the derivative dTcata/dt, i.e., by calculating a value T=C1 (dTcata/dt), taking the curve C1 as an example, then by comparing this value T to the measurement of the measurement of the temperature Tcata to determine the position of the couple (dTcata/dt, Tcata) with respect to C1, an embodiment of the correction means 44 consists in determining, as a function of the measurement of the outside temperature Text, a corrective parameter p and in multiplying the value T by the parameter p, thus obtaining a new value T'=p×T serving for the comparison with Tcata to determine the position of the couple for the measurement of the outside temperature Text with respect to the curve C1.

In an analogous manner, the measurement of the speed V of the vehicle is supplied to means 46 for correcting the derivative/temperature map adapted to determine a corrective parameter for each value of C1 and C2 memorized in the means 42 as a function of the measurement of the speed V, and to multiply each value of C1 and C2 by the associated corrective parameter. Otherwise, the correction means 46 can be adapted to determine a corrective parameter q as a function of the measurement of the speed V of the vehicle and to multiply the above-mentioned value T or T' by the value q.

In another embodiment, the correction means 44 and 46 are adapted to select a derivative/temperature map among a predetermined group of maps memorized in the mapping means 42 as a function of the measurement of the temperature Text and of the speed V of the vehicle.

In an advantageous manner, the correction of the map of the map-forming means 42 is performed before each estimation of the operating state of the catalyst in order to obtain a robust estimation.

Figure 5:
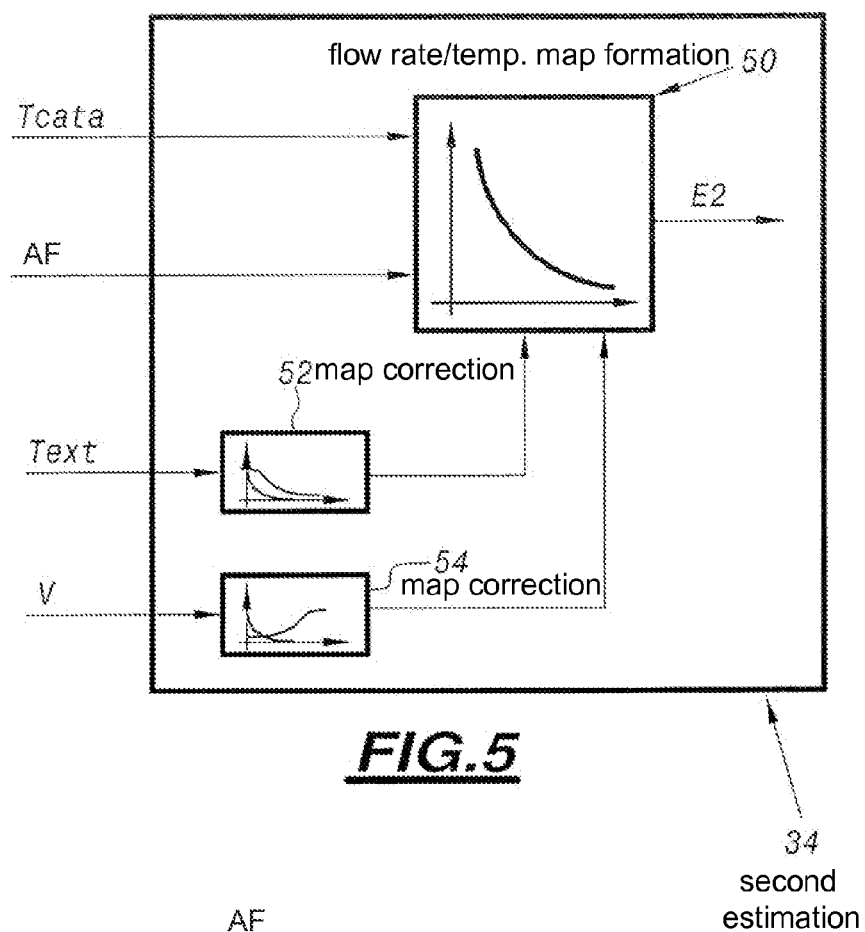
FIG. 5 is a schematic view of the means for estimating the state of the catalyst based on the flow rate of air entering the engine and the measurement of the temperature downstream of the catalyst and which are part of the control means of FIG. 2.

The structure and the operation of the second estimation means 34 will now be described in more details in relation to FIGS. 5 and 6.

Figure 3:
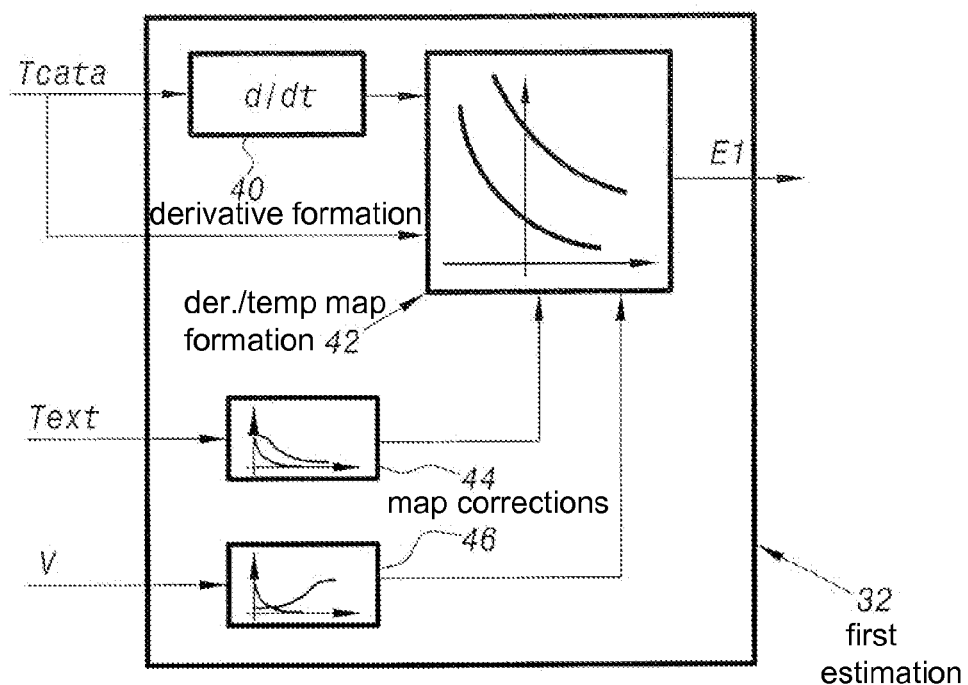
FIG. 3 is a schematic view of the means for estimating the state of the catalyst based on the measurement of the temperature downstream of the catalyst and its derivative and which are part of the control means of FIG. 2.

The second estimation means 34 operate in a manner analogous to that of the first estimation means 32 described with respect to FIGS. 3 and 4. They comprise means 50 forming flow rate/temperature map receiving as an input measurements of the temperature Tcata downstream of the catalyst and of the air flow rate AF. These map-forming means 50 are adapted to estimate the operating state of the catalyst as a function of the localization of these measurements in a zone of a predetermined flow rate/temperature map of at least a first operating zone ZNI, representative of the non-initialized operating state of the catalyst, and a second zone ZI of the operating zone, representative of the initialized operating state of the catalyst.

Figure 6:
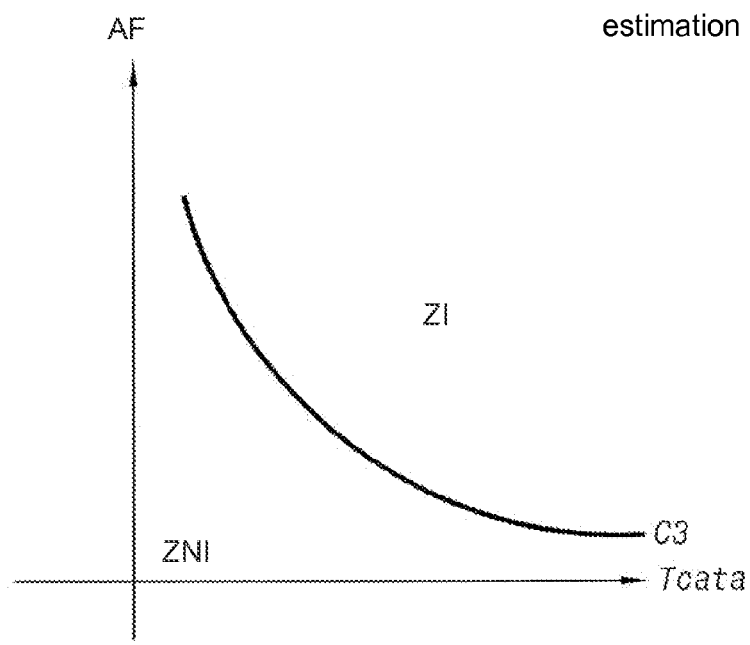
FIG. 6 is a graph of an air flow rate/temperature map implemented by the estimation means of FIG. 5.

An example of such a mapp is illustrated on FIG. 6 which is a graph having on the ordinate the air flow rate AF at the inlet of the engine and on the abscissa the temperature Tcata downstream of the catalyst. The air flow rate/temperature map of the map-forming means 50 comprise a curve C3, for example, determined during the previous study and memorized in the form of a correspondence table in the map-forming means 50. This curve C3 delimits the zone ZNI representative of the non-initialized operating state of the catalyst and the zone ZI representative of the initialized operating state of the catalyst.

If the couple of values (AF, Tcata) belongs to the zone ZNI, then the estimated operating state E2, supplied by the map-forming means 50, is the non-initialized state of the catalyst. Similarly, the state E2 supplied by the means 50 is the initialized operating state if the couple of values (AF, Tcata) belongs to the zone ZI.

Another embodiment of the map-forming means 50 is based on a map constituted by two curves making it possible to define an undetermined zone ZU between the zones ZNI and ZI. The performance of the estimation as a function of the measurements of the air flow rate AF and of the temperature Tcata downstream of the catalyst is then analogous to that described in relation to FIGS. 3 and 4 concerning the estimation means of FIG. 3.

The air flow rate/temperature map of the means 50 is further corrected by correction means 52, 54 as a function of the measurements of the outside temperature Text and of the speed V of the vehicle which they receive as input, respectively, in a manner analogous to that described for the correction means 44, 46 of FIG. 3.

Figure 7:
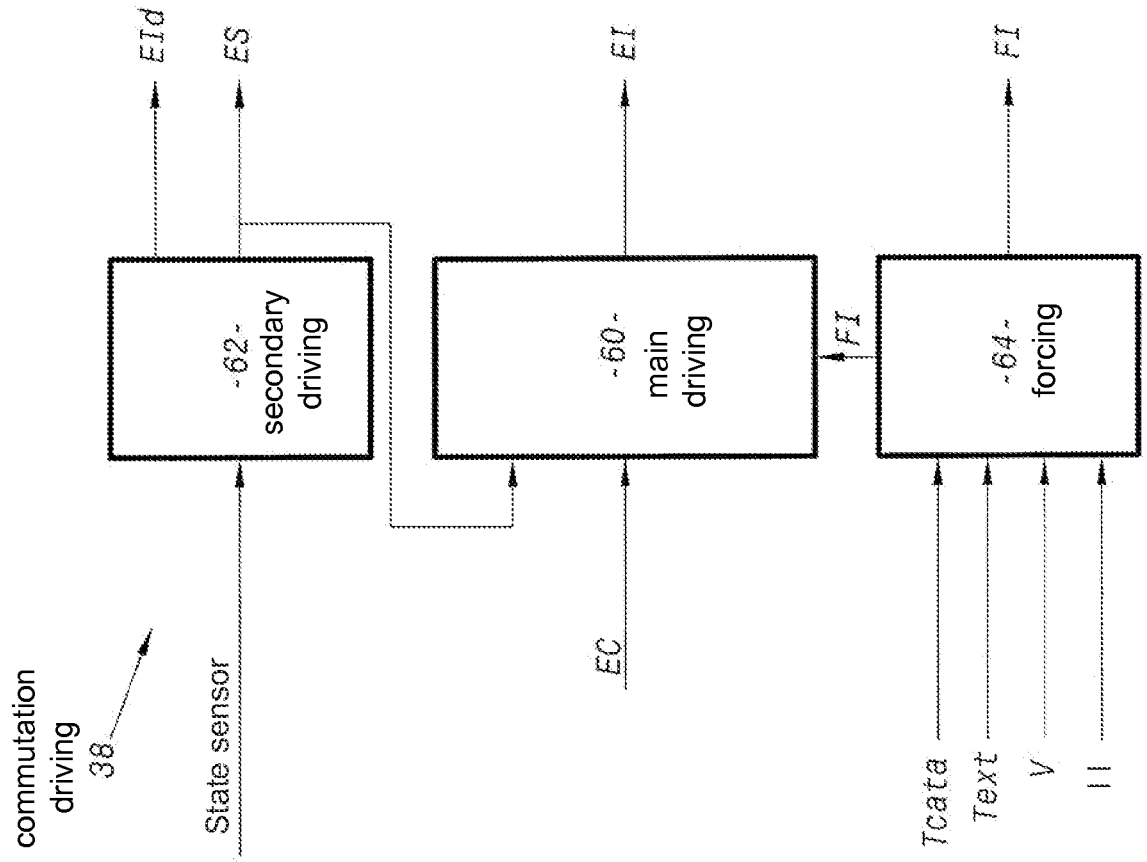
FIG. 7 is a schematic view of the means for driving the commutations which are part of the control means of FIG. 2.

On FIG. 7 is illustrated in a schematic manner the structure of the driving means 38 of FIG. 2.

The driving means comprise main driving means 60 adapted to control the commutation of the post-injections of fuel into the cylinders by sending a control signal EI to the supply means as a function of the estimated operating state EC of the catalyst, which they receive as input.

More particularly, these main driving means 60 control the commutations according to a predetermined law so as to maximize the amount Qc of heat released by the catalyst for the regeneration of the PF, while implementing a control law minimizing the amount Qp of pollutant emitted by this catalyst, for example, by maximizing a criteria of the type Qc/Qp.

For example, when the estimated state of the catalyst is in the initialized state, the main driving means 60 control the commutation of the post-injections to their catalyst initialized state-maintaining value. Thus, the adjustment of the post-injections to their maintaining value is performed when the catalyst is in its initialized state, and thus adapted to oxidize a large amount of fuel, which limits the emission of pollutants, in particular the emission of hydrocarbons not burned by the catalyst, while requiring that the catalyst be supplied with a large amount of fuel to generate a maximal amount of heat upstream of the PF.

Of course, other commutation control laws can be implemented by the main driving means 60.

The driving means comprise further secondary driving means 62 adapted to drive the commutations of the post-injections according to a degraded operating mode. These secondary driving means receive as an input a signal representative of the state of the sensor downstream of the catalyst, or they can comprise means for diagnosing the state thereof. If this sensor has a failure, the driving means 62 emit, for example, an inhibition signal ES of the estimation means 30 and of the main driving means 60, and supply as an output a signal of commutation control by default, for example, the commutation of the post-injections to their catalyst initialized state-maintaining value in order to favor the regeneration of the particle filter vis-à-vis the emission of pollutants by the catalyst.

Finally, the driving means comprise forcing means 64 adapted to force the post-injections to their initialization value. The forcing means 64 are adapted to block the post-injections at their initialization value when the engine is idling at least for a predetermined duration. Thus, an acceleration triggered by the driver subsequent to such idle does not cause an excessive emission of pollutants, in particular of fuel not oxidized by the catalyst cooled during the idle.

Figure 8:
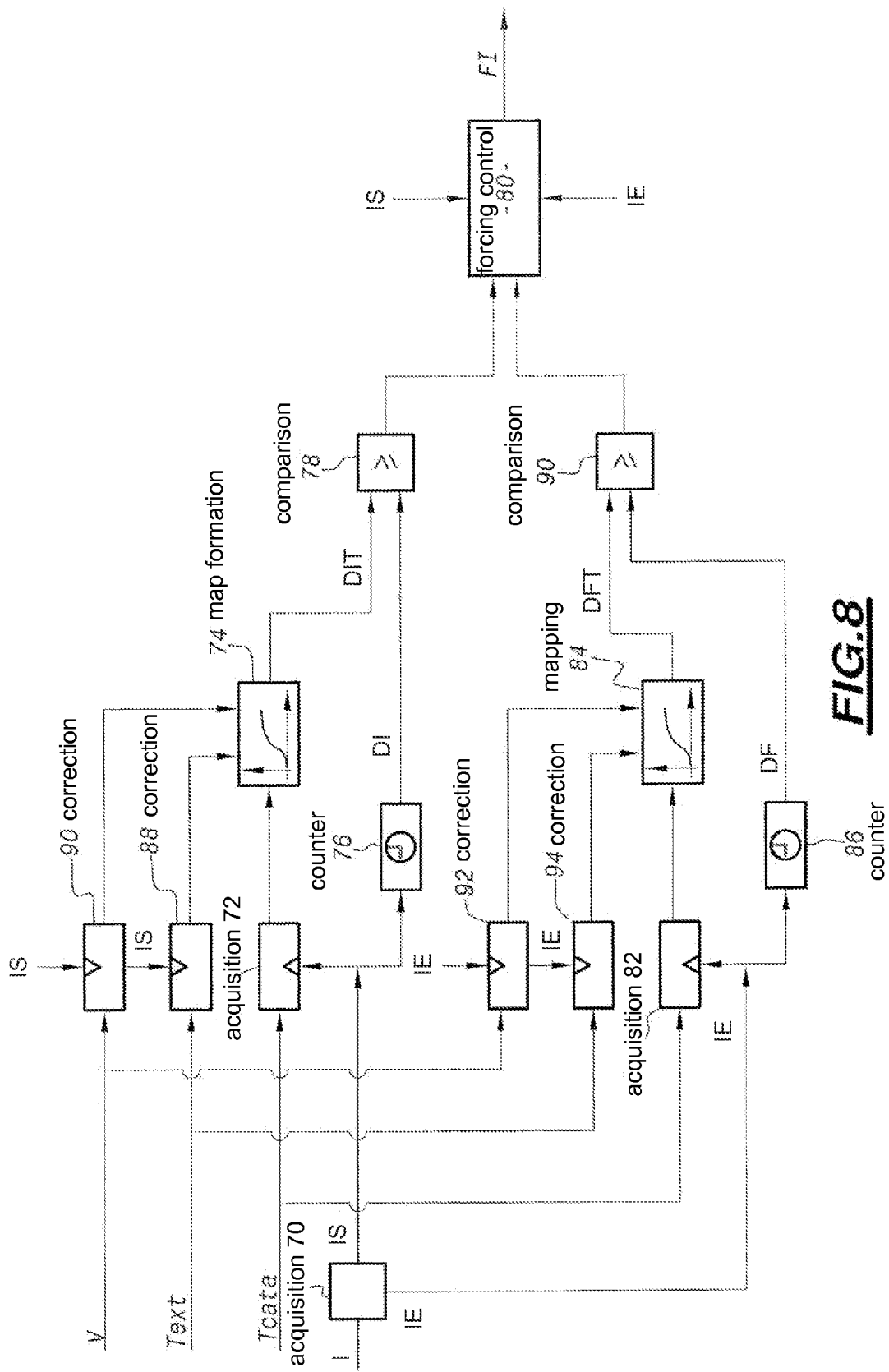
FIG. 8 is a schematic view of forcing means which are part of the control means of FIG. 2.

The structure of the forcing means 64 is illustrated in a schematic manner on FIG. 8.

The forcing means 64 receive as an input the idle I acquired and the measurements of the temperature Tcata downstream of the catalyst, of the outside temperature Text, and of the speed V of the vehicle.

These forcing means 64 comprise means 70 for acquiring the instant of the start IS and the instant of the end IE of an idle triggered by the conductor of the vehicle, for example.

When the acquisition means 70 detect the start of the idle, these means acquire the instant of the start IS thereof and deliver it to means 72 that acquire, as a response, the value of the measurement of the temperature Tcata at that instant.

The value of this measurement of the temperature Tcata is then supplied to means 74 forming map of threshold idle durations which determine a threshold idle duration DIT corresponding to the minimal duration that the engine must spend in idle to implicate a forcing of the post-injections to their initialization value. To this effect, the means 74 evaluate, for the value of the measurement of the temperature Tcata at the instant of the start of the idle, a predetermined map of idle duration values, for example, implemented in the form of a correspondence table therein, and supplying as an output the corresponding threshold idle duration DIT.

The instant of the start of the idle is also supplied to a counter 76 which starts to count the duration of the idle from the instant of the start thereof. The output DI of this counter 76 and the threshold idle duration DIT are supplied to means for comparing the value DI of the counter 76 to the threshold idle duration DIT which supply the result of this comparison to forcing control means 80. If the idle duration DI is above or equal to the threshold idle duration DIT, the control means 80 then control the forcing of the post-injections to their initialization value.

Further, as soon as the acquisition means 70 detect the end of the idle, they acquire the instant IE of end thereof and supply it to the forcing control means 80.

If these means have controlled the forcing of the post-injection, i.e., if the value DI of the counter 76 is above or equal to the threshold idle duration DIT, then the instant of the end of the idle IE is also supplied to means 82 for acquiring the measurement of the temperature Tcata at that instant. Mapping means 84 determine then a threshold forcing duration DFT of the post-injections at their initialization value by evaluating a predetermined map of forcing duration values, for example, implemented in the form of a correspondence table, as a function of the value of the measurement of the temperature Tcata that they receive as an input.

The instant of the end of the EI is also supplied to a forcing duration counter 86 that starts to count, from the reception of the instant of the end of the idle, the time passed in the forcing state.

The value DF of the counter 86 and the threshold forcing duration DFT are supplied to means 90 for comparing the value DF of the counter 90 with the threshold forcing duration DFT and supply the result of this comparison to forcing control means 80.

When the value DF of the counter 90 is above or equal to the threshold forcing duration DFT, the forcing control means 80 then annul the forcing of the post-injections, the driving of the commutations among the various values of the post-injections becoming again possible as a function of the estimated operating state of the catalyst.

The forcing means comprise additionally means 88, 90, 92, 94 for correcting maps of threshold idle duration and of threshold forcing duration of the map-forming means 74 and 84 as a function of operating parameters of the engine and/or driving conditions of the vehicle, in particular the outside temperature Text and/or the speed V of the vehicle.

Correction means 88 receive as an input the measurement of the outside temperature Text, and acquire its value at the instant of the end of the idle IE. These correction means 88 then determine, as a function of the measurement of Text at this instant IE, a corrective parameter, for example, by interrogation of a correspondence table memorized in these means 88, and multiply the output of the means 74 by the corrective parameter determined in order to perform a correction of the map of the threshold idle time durations.

The forcing means comprise also means 90 for correcting the above-mentioned map as a function of the measurement of the speed V of the vehicle at the instant of the start of the idle and means 92, 94 for correcting the map of threshold forcing durations as a function of the measurement of the outside temperature Text and of the measurement of the speed V of the vehicle at the instant of the end of the idle, respectively. These correction means 90, 92, 94 operate in a manner analogous to that of the correction means 88 described above.

FIGS. 9a-9d are chronograms illustrating the operation of the forcing means 64.

On these Figures, the convention is adopted according to which the output FI of the forcing means is equal to 1 when the forcing of the post-injections at their initialization value is effective, and 0 otherwise, an idle I is equal to 1 when it is performed, and 0 otherwise.

Figure 9A:
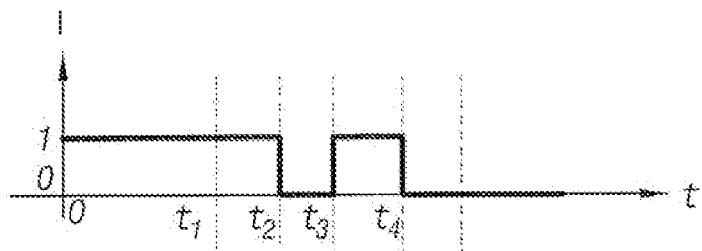
FIGS. 9A to 9D are chronograms illustrating the operation of the forcing means of FIG. 8.
Figure 9B:
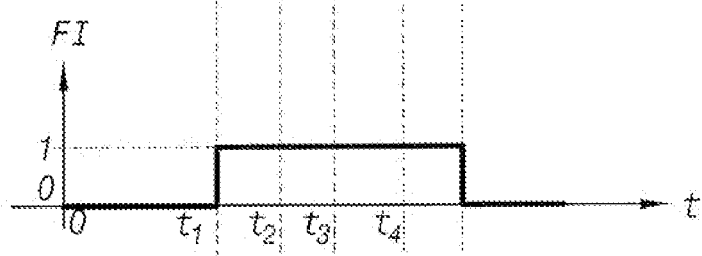
Figure 9C:
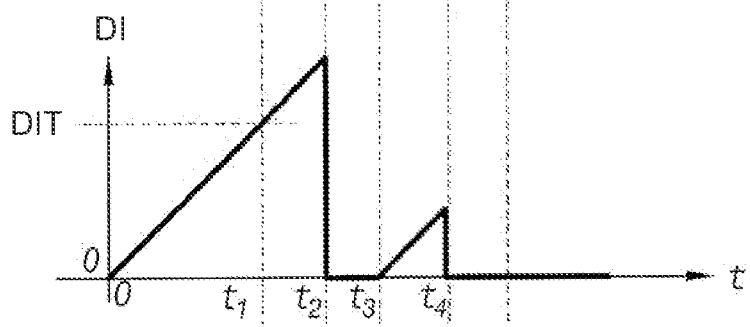
Figure 9D:
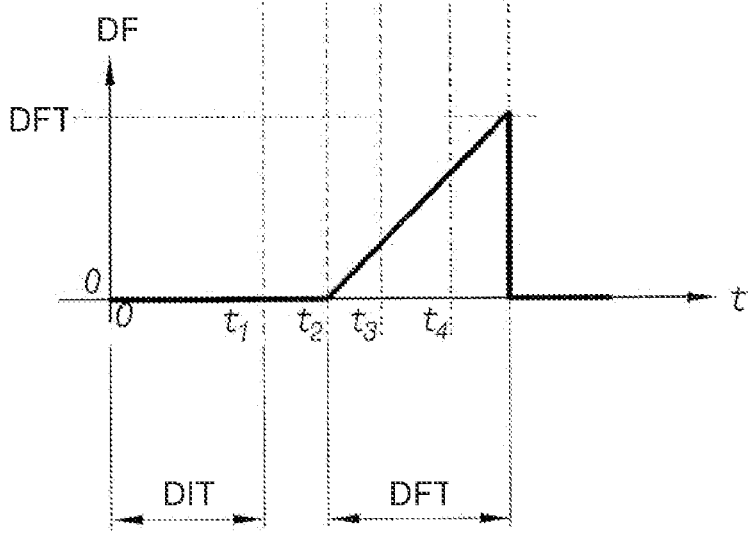

On FIG. 9A, an idle is triggered at instant 0. The threshold idle duration value DIT is then determined by the means 72, 74, 88, and 90 in the manner described above regarding FIG. 8 and the counter 76 starts to count the time passed DI by the engine in this idle.

When the value DI of the counter 76 is equal, at the instant t1=DIT, to the threshold idle duration DIT, the control means 80 trigger the forcing of the post-injections to their initialization value.

At the instant t2, the end of the idle is triggered, for example, by the driver of the vehicle, and the threshold forcing duration DFT is then determined by the means 82, 84, 92, and 94 in the manner described above regarding FIG. 8. The counter 86 then starts to count the time passed DF in the forcing state of the post-injections.

At the instant t3, a new idle is triggered and ends at the instant t4. Since the duration of this idle is not above a threshold idle duration calculated as a response to the triggering thereof, the forcing of the post-injections is not re-initialized, and the forcing of the post-injection caused by the first idle continues in a normal way.

When the value DF of the counter 84 is equal to the threshold forcing duration DFT, the control means then annul the forcing.

Of course, other embodiments are possible. A complete embodiment of the system according to the invention has been described above regarding FIGS. 1 to 9.

Other embodiments of this system consist in, for example, implementing, for the estimation of the operating state of the catalyst, only the estimation means based on the measurement of the temperature downstream of the catalyst and of its derivative and/or not implementing the forcing means.

The invention claimed is:

1. System for controlling the operation of a motor vehicle diesel engine associated with depollution means comprising an oxidation catalyst and arranged in an exhaust line of this engine, this catalyst having at least a non-initialized operating state and an initialized operating state, and this engine being also associated with means for supplying fuel to the cylinders thereof according to at least one injection during their expansion phase, wherein said system comprises:
   a single temperature sensor placed in the exhaust line of the engine downstream of the catalyst to measure the temperature downstream of the catalyst; and
   means for controlling the means for supplying fuel to the cylinders adapted to control the commutation of the phasing and/or of the amount of fuel injected during the expansion phase between a first initialization value of the catalyst and a second initialized operating state-maintaining value as a function of the measurement of the temperature downstream of the catalyst,
   wherein the control means comprise:
      means for estimating the operating state of the catalyst as a function of the temperature downstream of the catalyst; and
      driving means adapted to drive the commutation between said first and second initialization and initialized state-maintaining values as a function of the operating state of the catalyst estimated according to a predetermined commutation law,
   and wherein the means for estimating the operating state of the catalyst comprise:
      means for forming the time derivative of the temperature measurement downstream of the catalyst; and
      means forming a derivative/temperature map adapted to estimate the operating state of the catalyst as a function of the localization of the temperature measurement downstream of the catalyst and of its derivative, in a predetermined derivative/temperature map zone including at least (i) a first operating zone, representative of the non-initialized operating state of the catalyst, and (ii) a second operating zone, representative of the initialized operating state of the catalyst.

2. System according to claim 1, which comprises additionally means for acquiring operating parameters of the engine and/or driving parameters of the vehicle, and the estimation means comprise means for correcting the predetermined derivative/temperature map as a function of the parameters acquired.

3. System according to claim 2, wherein the means for acquiring operating parameters of the engine and/or driving parameters of the vehicle are adapted to measure the outside temperature of the vehicle, and the correction means are adapted to correct the derivative/temperature map as a function of the outside temperature measured.

4. System according to claim 2, wherein the means for acquiring operating parameters of the engine and/or driving parameters of the vehicle are adapted to measure the speed of the vehicle, and the means for correcting the derivative/temperature map are adapted to correct the predetermined derivative/temperature map as a function of the speed of the vehicle measured.

5. System according to claim 1, which comprises additionally means for measuring the air flow rate at the inlet of the engine, and wherein the means for estimating the operating state of the catalyst comprise means forming flow rate/temperature map adapted to estimate the operating state of the catalyst as a function of the localization of the air flow rate measurements and temperature measurements downstream of the catalyst in a zone of a predetermined flow rate/temperature map of at least a first operating zone, representative of the non-initialized operating state of the catalyst, and a second operating zone, representative of the initialized operating state of the catalyst.

6. System according to claim 5, which comprises additionally means for acquiring operating parameters of the engine and/or driving parameters of the vehicle, and the estimation means comprise means for correcting the predetermined flow rate/temperature map as a function of the parameters acquired.

7. System according to claim 6, wherein the means for acquiring operating parameters of the engine and/or driving parameters of the vehicle are adapted to measure the speed of the vehicle, and the means for correcting the derivative/temperature map are adapted to correct the flow rate/temperature map as a function of the speed of the vehicle measured.

8. System according to claim 1, wherein the depollution means comprise, downstream of the catalyst and of the temperature sensor, a particle filter that needs to be regularly and/or periodically regenerated, the catalyst being adapted, in its initialized operating state, to increase the temperature of the particle filter to facilitate its regeneration by combustion of the particles trapped therein, and in that the driving means are adapted at least to optimize the regeneration of the particle filter.

9. System according to claim 1, wherein the depollution means comprise, downstream of the catalyst and of the temperature sensor, a NOx trap that needs to be regularly and/or periodically regenerated, the catalyst being adapted, in its initialized state, to increase the temperature of the NOx trap to facilitate its regeneration by combustion of the particles trapped therein, and the driving means are adapted at least to optimize the regeneration of the NOx trap.

10. System according to claim 8, wherein the driving means are adapted to drive the commutation between said first and second initialization and initialized state-maintaining values according to a predetermined transition law that maximizes a predetermined criteria of the type Qc/Qp, where Qc is the amount of heat released by the catalyst downstream thereof and Qp is the amount of pollutants emitted by the catalyst, in order to minimize the amount of pollutants emitted by the catalyst while maximizing the amount of heat released by this catalyst.

11. System according to claim 1, wherein the control means comprise means for forcing the injection of fuel into the cylinders during their expansion phase at the first initialization value of the catalyst as soon as an idle of the engine has lasted at least a predetermined threshold idle duration, and this during a predetermined forcing duration after the instant of the end of the engine.

12. System according to claim 11, wherein the forcing means comprise means for determining the threshold idle duration as a function of the measurement of the temperature downstream of the catalyst at the instant of the start of the idle.

13. System according to claim 11, wherein the forcing means comprise means for determining the threshold forcing duration as a function of the measurement of the temperature downstream of the catalyst at the instant of the end of the idle.

14. System according to claim 13, wherein the means for determining the threshold forcing duration comprise:
  means for acquiring the instant of the end of the idle; and
  means forming forcing duration map adapted, at the instant of the end of the idle, to determine the forcing duration by evaluating, for the measurement of the temperature downstream of the catalyst at the instant of the end of the idle, a predetermined map of forcing duration values as a function of temperature values downstream of the catalyst.

15. System according to claim 14, wherein the means for determining the threshold forcing duration comprise additionally means for correcting the predetermined map of forcing duration values as a function of predetermined operation parameters of the engine and/or driving parameters of the vehicle.

16. System according to claim 15, wherein the means for correcting the predetermined map of forcing duration values are adapted to acquire the outside temperature of the vehicle and/or the speed of the vehicle at the instant of the end of the idle and to correct, the predetermined map of forcing duration values as a function of this outside temperature of the vehicle acquired and/or of this measurement of the speed of the vehicle acquired.

17. System according to claim 1, which comprises additionally means for diagnosing the operating state of the temperature sensor downstream of the catalyst, and wherein the driving means are adapted to implement a predetermined commutation strategy by default if the temperature sensor is diagnosed as failing.

18. System for controlling the operation of a motor vehicle diesel engine associated with depollution means comprising an oxidation catalyst and arranged in an exhaust line of this engine, this catalyst having at least a non-initialized operating state and an initialized operating state, and this engine being also associated with means for supplying fuel to the cylinders thereof according to at least one injection during their expansion phase, wherein said system comprises:
  a single temperature sensor placed in the exhaust line of the engine downstream of the catalyst to measure the temperature downstream of the catalyst; and
  means for controlling the means for supplying fuel to the cylinders adapted to control the commutation of the phasing and/or of the amount of fuel injected during the expansion phase between a first initialization value of the catalyst and a second initialized operating state-maintaining value as a function of the measurement of the temperature downstream of the catalyst,
  wherein the control means comprise:
    means for estimating the operating state of the catalyst as a function of the temperature downstream of the catalyst; and
    driving means adapted to drive the commutation between said first and second initialization and initialized state-maintaining values as a function of the operating state of the catalyst estimated according to a predetermined commutation law, which comprises additionally means for measuring the air flow rate at the inlet of the engine,
  and wherein the means for estimating the operating state of the catalyst comprise means forming flow rate/temperature map adapted to estimate the operating state of the catalyst as a function of the localization of the air flow rate measurements and temperature measurements downstream of the catalyst in a zone of a predetermined flow rate/temperature map of at least a first operating zone, representative of the non-initialized operating state of the catalyst, and a second operating zone, representative of the initialized operating state of the catalyst,
  said system comprising additionally means for acquiring operating parameters of the engine and/or driving parameters of the vehicle, and the estimation means comprise means for correcting the predetermined flow rate/temperature map as a function of the parameters acquired,
  wherein the means for acquiring operating parameters of the engine and/or driving parameters of the vehicle are adapted to measure the outside temperature of the vehicle, and the means for correcting the flow rate/temperature map are adapted to correct the flow rate/temperature map as a function of the outside temperature measured.

19. System for controlling the operation of a motor vehicle diesel engine associated with depollution means comprising an oxidation catalyst and arranged in an exhaust line of this engine, this catalyst having at least a non-initialized operating state and an initialized operating state, and this engine being also associated with means for supplying fuel to the cylinders thereof according to at least one injection during their expansion phase, wherein said system comprises:
  a single temperature sensor placed in the exhaust line of the engine downstream of the catalyst to measure the temperature downstream of the catalyst; and
  means for controlling the means for supplying fuel to the cylinders adapted to control the commutation of the phasing and/or of the amount of fuel injected during the expansion phase between a first initialization value of the catalyst and a second initialized operating state-maintaining value as a function of the measurement of the temperature downstream of the catalyst,
  wherein the control means comprise means for forcing the injection of fuel into the cylinders during their expansion phase at the first initialization value of the catalyst as soon as an idle of the engine has lasted at least a predetermined threshold idle duration, and this during a predetermined forcing duration after the instant of the end of such idle of the engine,
  wherein the forcing means comprise means for determining the threshold idle duration as a function of the measurement of the temperature downstream of the catalyst at the instant of the start of the idle,
  wherein the means for determining the threshold idle duration comprise:
    means for acquiring the instant of the start of the idle; and
    means forming map of threshold idle durations adapted, at the acquisition of the instant of the start of the idle, to determine the threshold idle duration by evaluating, for the measurement of the temperature downstream of the catalyst at the instant of the start of the idle, a predetermined map of idle duration values as a function of temperature values downstream of the catalyst.

20. System according to claim 19, wherein the means for determining the threshold idle duration comprise additionally means for correcting the predetermined map of idle duration values as a function of predetermined operating parameters of the engine and/or driving parameters of the vehicle.

21. System according to claim 20, wherein the means for correcting the predetermined map of idle duration values are adapted to acquire the outside temperature of the vehicle and/or the speed of the vehicle at the instant of the start of the idle and to correct the predetermined map of idle duration values as a function of this outside temperature acquired and/or of this speed measurement acquired.

* * * * *